United States Patent [19]

Huling

[11] 4,198,877
[45] Apr. 22, 1980

[54] CONTROL CABLE FAIL SAFE DEVICE

[75] Inventor: Don W. Huling, Kent, Wash.

[73] Assignee: The United States of America as represented by the Secretary of the Air Force, Washington, D.C.

[21] Appl. No.: 922,603

[22] Filed: Jul. 7, 1978

[51] Int. Cl.² ............................................. F16C 1/10
[52] U.S. Cl. ............................ 74/501 R; 74/501.5 R; 74/96
[58] Field of Search .................... 74/469, 470, 501 R, 74/501.5 R

[56] References Cited

U.S. PATENT DOCUMENTS

| Re. 23,933 | 2/1955 | Cushman | 74/501.5 |
|---|---|---|---|
| 2,581,080 | 1/1952 | Cushman | 74/501.5 |
| 2,591,011 | 4/1952 | Rose et al. | 74/501.5 |
| 2,810,300 | 10/1957 | Pigford | 74/501.5 |
| 3,599,507 | 8/1971 | Exton | 74/469 |
| 4,170,147 | 10/1979 | Durno et al. | 74/96 |

*Primary Examiner*—Louis Rimrodt
*Attorney, Agent, or Firm*—Joseph E. Rusz; Casimer K. Salys

[57] ABSTRACT

A mechanical apparatus for retaining actuator control in the event of a failure in one of the two cables used to regulate a two cable quadrant type actuator. In response to a cable failure the mechanism transforms the dual cable system into a tension loaded single cable configuration. Operationally, the failure of a cable releases its associated quadrant, which then rotates in response to a tension device acting between the two quadrants until it is driven against a fixed stop. The onset of the quadrant rotation actuates a quadrant lock device to prevent relative motion between the operable quadrant and the output actuation means. The tension device connecting the two quadrants now acts between the inoperable quadrant, resting against a fixed stop, and operable quadrant, such that the operable quadrant has a force tending to rotate it whenever the control cable tension is not balanced by the effects of the tension device.

5 Claims, 6 Drawing Figures

CONTROL CABLE FAIL SAFE DEVICE

RIGHTS OF THE GOVERNMENT

The invention described herein may be manufactured and used by or for the Government of the United States for all governmental purposes without the payment of any royalty.

BACKGROUND OF THE INVENTION

(1) Field of the Invention

This invention is in the field of cable control systems and more specifically relates to two cable mechanical control systems having the capability to operate when one of the two cables is severed.

(2) Description of the Prior Art

Cable actuated control systems are well known in the art, often being used in light aircraft to effectuate movement in the aerodynamic surfaces. The use of a two cable configuration, in which the output actuator is driven by a quadrant connection of the cable, is a fairly standard technique of interfacing control cables with an output actuator so as to retain full control in either direction of movement. Though the prior art does contain teachings of apparatus for removing slack from such control cables, for example U.S. Pat. No. 2,810,300 and No. Re 23,933, the applicant is not aware of an apparatus for retaining control of the output actuator in the presence of a complete cable separation.

The designers of military aircraft are especially concerned with the survivability aspects of an aircraft's mechanisms, namely their ability to retain the aircraft airworthy after it sustains battle damage, such as having a control cable severed. The prior art does address itself to the problem of preventing the hardover position of free vibration usually occurring after a cable break in a two cable control system. A representative device is shown in U.S. Pat. No. 3,599,507. Since the control rod in this invention is centered to a neutral position by the opposing action of two springs, the apparatus mitigates only the secondary effects of a cable separation, acquiescing to the loss of control between pilot's end and the output actuator end of the cables.

SUMMARY OF THE INVENTION

This invention discloses a mechanism capable of sensing a single cable failure in a two cable quadrant type control system and responding by structurally reorientating the quadrant end mechanism into one performing as if it was a tension loaded single cable system.

Upon the occurrence of a cable break, the quadrant half attached to the broken cable is rotated until it reaches a fixed stop by a torque producing device acting between the two quadrants. As this quadrant begins to rotate, it actuates a locking device to prevent relative movement between the quadrant half having the operable cable and the output actuator. Thereby, the torque producing device acts between the fixed stop and the operable quadrant to produce a cable tension in a direction opposite that imposed at the driven end.

DESCRIPTION OF THE PREFERRED EMBODIMENT

Figure 1:
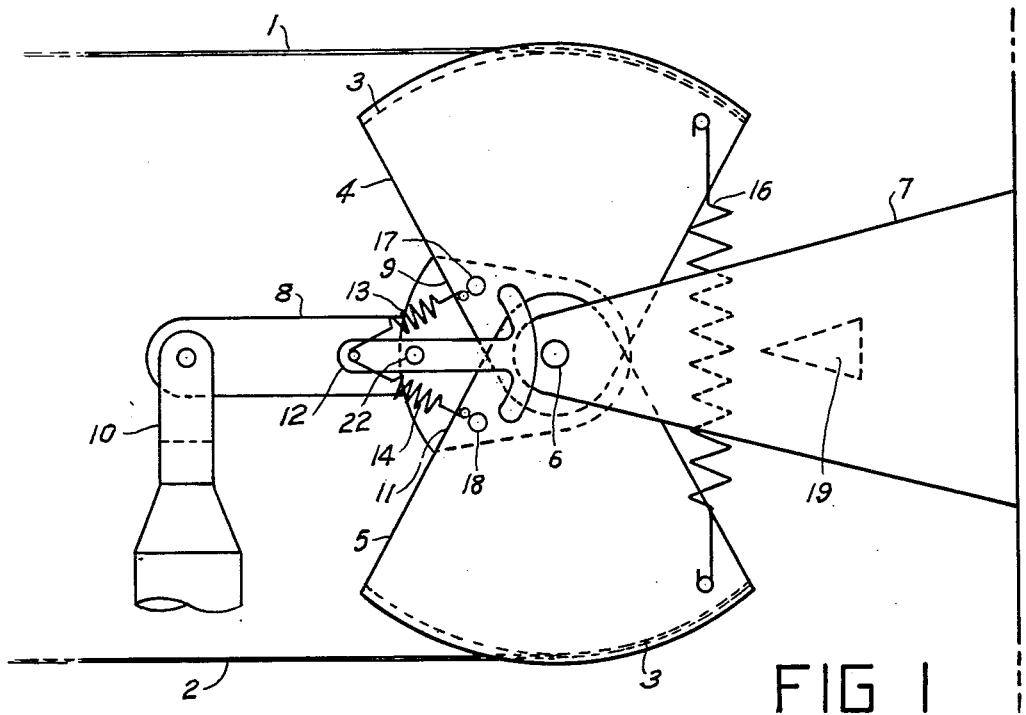
FIG. 1 is a schematic diagram of the cable quadrant mechanism disclosed herein with the control cables intact.

An apparatus embodying the disclosed invention appears in FIG. 1. When upper cable 1 and lower cable 2 are intact, the mechanism is driven by a tension unbalance in the two cables. Cables 1 and 2 are attached at their far ends to upper quadrant half 4 and lower quadrant half 5, respectively, fitting within grooves 3 on the two quadrant halves whenever the quadrants rotate. The upper and lower quadrant halves, 4 and 5, are themselves rotatably attached by center pin 6 to fixed mounting bracket 7, forming moment arms thereabout. Output lever 8 is also pivotally attached by center pin 6 and has two stop surfaces, 9 and 11, against which respective quadrant halves 4 and 5 act to transform tension in drive cables 1 and 2 to a force in output lever 8 for actuating control rod 10.

During normal operation, with the cables intact, cable tension acting through stop surfaces 9 and 11 moves control rod 10. The other elements of the mechanism shown, including quadrant lock 12, which is normally held in its central position by upper and lower lock springs 13 and 14, quadrant spring 16, quadrant lock pins 17 and 18, and quadrant stop 19, perform no necessary function until a control cable failure occurs.

Figure 2:
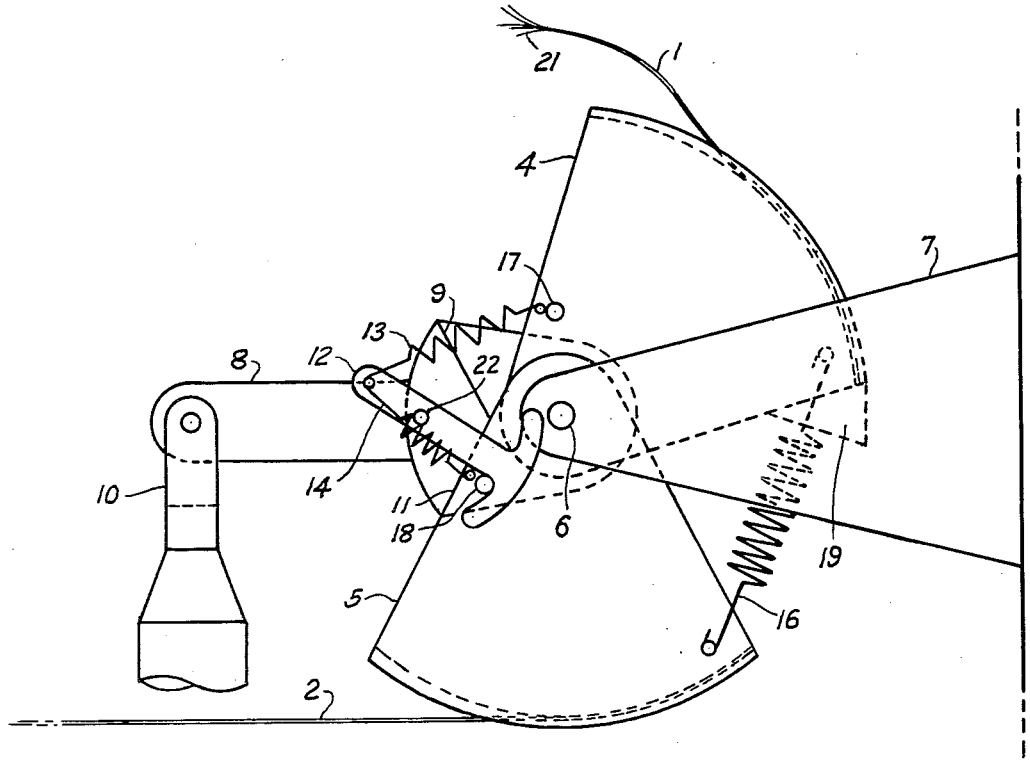
FIG. 2 shows the mechanism of FIG. 1 reorientated after the occurrence of a cable failure.

FIG. 2 shows the orientation of the mechanism appearing in FIG. 1 after cable break 21 causes the mechanism to react. When the cable breaks, the tension in quadrant spring 16 rotates upper quadrant half 4 clockwise until it rests against fixed stop 19, attached to mounting bracket 7. At the onset of this rotation the tension in upper locking spring 13 is increased beyond that in lower locking spring 14, causing quadrant lock 12 to rotate rapidly clockwise about mounting pin 22 and engage quadrant lock pin 18, as shown in FIG. 2. The resultant effect is that output lever 8 becomes locked to lower quadrant 5, the quadrant having the unbroken cable, and operates in unison therewith. Clockwise torque from lower quadrant half 5 is transmitted to output lever 8 through stop 11, while counterclockwise torque travels through quadrant lock pin 18, quadrant lock 12, mounting pin 22 and then into output lever 8.

When viewed from the control or drive end of cables 1 and 2, the failure of a cable, such as cable 1 described above, does not result in a loss of control or unrestrained rotation of output lever 8. The apparatus as shown and described with respect to FIG. 2 changes the two cable control to a tension return or tension loaded single cable configuration, where quadrant spring 16 creates the tension loading effect.

Obviously, the symmetry of the mechanism produces an analogous outcome if cable 2 fails, though in such a case the tension loading effect at the control or drive end acts in the opposite direction. Thereby, the disclosed mechanism provides not only redundancy in the operation of the control cables, but does so in a manner which allows the operator to ascertain which cable is severed.

As noted in the foregoing the apparatus shown and described constitutes only one of many embodiments forming the subject matter of this invention. The mechanism in FIGS. 1 and 2 is susceptible to a variety of structural refinements to either the individual functioning elements or diverse combinations thereof. All are still within the purview of the invention.

Figure 3:
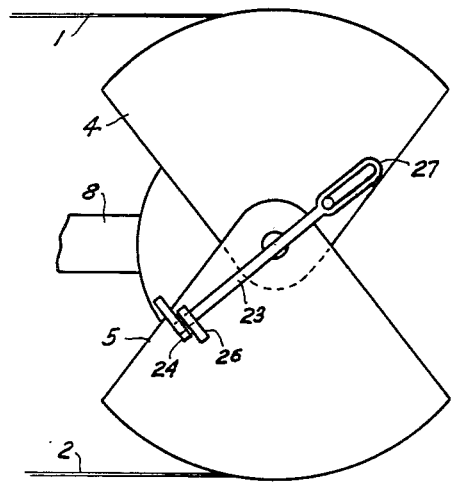
FIGS. 3, 4, 5 and 6 are schematic embodiments of the invention showing various refinements in the functional elements of the mechanisms in FIGS. 1 and 2.

Representative variants appear in ensuing FIGS. 3, 4, 5 and 6, where the structures are shown schematically with emphasis placed on the features distinguishing those embodiments from the preferred one described with reference to the first two figures. The first variant is depicted in FIG. 3, arranged in a form where flexible pin 23 is employed to lock output lever 8 with lower quadrant half 5 when cable 1 breaks. Locking occurs when pin 23 is driven through aligned holes in locking tabs 24 and 26 as a break in cable 1 rotates upper quadrant half 4 with respect to lower quadrant half 5. Slot 27 in pin 23 allows motion without disengaging the pin. Of course, a symmetric mate to the structure shown in necessary to embrace the potential of cable 2 breaking.

Figure 4:
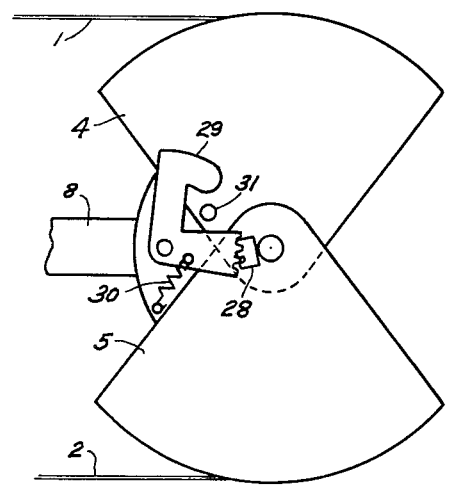

FIG. 4 shows another apparatus for locking a quadrant half, in this case lower quadrant half 5, to an output lever after a cable break. A break in cable 2 causes gear 28 on lower quadrant half 5 to rotate lock lever 29 toward lock pin 31. When gear 28 has rotated sufficiently to disengage, spring 30 further rotates locking lever 29 the remaining distance to engage lock pin 31, thereby fixing upper quadrant half 4 to output lever 8. This extended rotation of locking lever 29 after disengagement of the gears insures that these gears cannot mesh irrespective of any subsequent angular reorientations of lower quadrant half 5. As noted in the foregoing example, only one of the two necessary locking devices appears in the figure.

Figure 5:
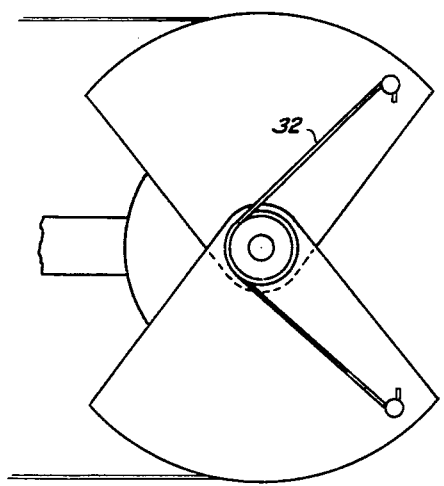

The structural variant appearing in FIG. 5 shows that the function performed by quadrant spring 16, as appears in FIG. 1, may be performed by other elements, such as torsion spring 32.

Figure 6:
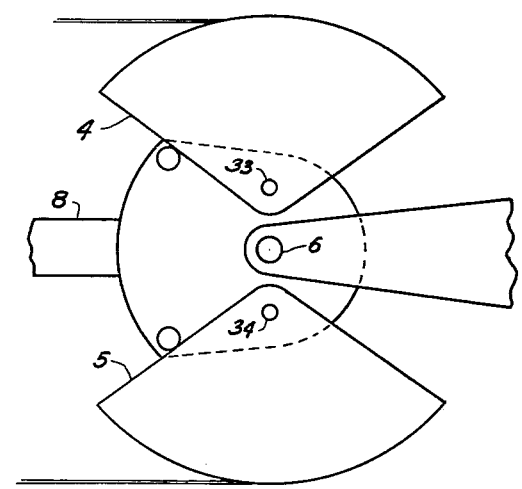

A further refinement is shown in FIG. 6. Here the rotational axes of upper quadrant half 4 and lower quadrant half 5, 33 and 34, respectively, are not coincident with center pin 6, as was the case in all the previous figure representations.

I claim:

1. A two cable control mechanism capable of sensing a cable failure and modifying its structure to respond thereafter as if the mechanism is in the form of a tension loaded single cable system, comprising:
    a. a fixed mounting bracket;
    b. a means for producing mechanical output pivotally attached to the mounting bracket;
    c. two independently rotatable quadrant halves, each having attached thereto one of the cables and making contact with the means for producing a mechanical output such that variations in unbalanced cable tension produce corresponding variations in the mechanical output;
    d. a means responsive to the occurrence of a cable failure for locking the quadrant half having the operable cable with the means for producing mechanical output, which means is actuated by relative movement of the quadrant halves;
    e. a means for producing tension in the cables by acting between the two quadrant halves; and
    f. a fixed stop between the quadrant halves for limiting the rotation of the quadrant half having the broken cable.

2. The mechanism as recited in claim 1, wherein the means for locking the operable quadrant half to the output means is a quadrant lock responding to unbalanced forces in opposing springs attached to each of the two quadrant halves, and the means for producing tension is a spring.

3. The mechanism as recited in claim 1, wherein the means for locking the operable quadrant half to the output means is a locking pin engaging aligned passages in both the operable quadrant half and the output means, and the means for producing tension is a spring.

4. The mechanism as recited in claim 1, wherein the means for locking the operable quadrant half to the output means is a quadrant lock, whose travel is directly responsive to the rotational magnitude of the quadrant half having the broken cable up to a threshold beyond which engagement remains fixed, and the means for producing tension is a spring.

5. The mechanisms as recited in claims 1, 2, 3 or 4, wherein the rotational axes of the quadrant halves are offset with respect to the rotational axis of the output means.

* * * * *